(12) United States Patent
Nystrom et al.

(10) Patent No.: US 9,757,900 B2
(45) Date of Patent: Sep. 12, 2017

(54) PIN-ACTUATED PRINTHEAD

(71) Applicant: XEROX CORPORATION, Norwalk, CT (US)

(72) Inventors: Peter J. Nystrom, Webster, NY (US); Barry P. Mandel, Fairport, NY (US); Andrew W. Hays, Fairport, NY (US); Jun Ma, Penfield, NY (US); David Allen Mantell, Rochester, NY (US); Gary D. Redding, Victor, NY (US); Peter M. Gulvin, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 162 days.

(21) Appl. No.: 14/717,560

(22) Filed: May 20, 2015

(65) Prior Publication Data

US 2016/0339635 A1 Nov. 24, 2016

(51) Int. Cl.
*B29C 67/00* (2017.01)
*B33Y 30/00* (2015.01)

(52) U.S. Cl.
CPC ...... *B29C 67/0059* (2013.01); *B29C 67/0085* (2013.01); *B29C 67/0051* (2013.01); *B29C 67/0055* (2013.01); *B33Y 30/00* (2014.12)

(58) Field of Classification Search
CPC ............ B29C 67/0051; B29C 67/0055; B29C 67/0059; B29C 67/0085; B33Y 30/00
USPC ....................................................... 425/375
See application file for complete search history.

(56) References Cited

U.S. PATENT DOCUMENTS

| 6,773,249 | B1 | 8/2004 | Przytulla et al. |
| 7,604,470 | B2 | 10/2009 | LaBossiere et al. |
| 7,765,949 | B2 | 8/2010 | Fork et al. |
| 8,002,254 | B2 * | 8/2011 | Bayer .................. B23Q 1/0018 269/20 |
| 8,801,415 | B2 | 8/2014 | Khoshnevis |
| 8,827,684 | B1 | 9/2014 | Schumacher et al. |
| 2004/0164436 | A1 | 8/2004 | Khoshnevis |
| 2004/0253365 | A1 | 12/2004 | Warren et al. |
| 2005/0103902 | A1 * | 5/2005 | Hornsell ............. F16K 31/0655 239/585.1 |
| 2014/0039659 | A1 | 2/2014 | Boyer et al. |

(Continued)

FOREIGN PATENT DOCUMENTS

| WO | 2014/200595 A2 | 12/2014 |
| WO | 2015/027938 A1 | 3/2015 |
| WO | 2015/077262 A1 | 5/2015 |

OTHER PUBLICATIONS

14717560 "ABS_Data_sheet", http://www.teststandard.com/data_sheets/ABS_Data_sheet.pdf, accessed Dec. 15, 2016.*

(Continued)

*Primary Examiner* — Matthew Daniels
*Assistant Examiner* — Lawrence D Hohenbrink, Jr.
(74) *Attorney, Agent, or Firm* — MH2 Technology Law Group LLP

(57) ABSTRACT

A pin actuated printhead includes an orifice through which a material is ejected, a chamber to hold the material to be ejected, a channel connecting the chamber to the orifice, and an actuated pin, to enter the orifice and to eject the material from the orifice. The printhead is configured to eject a material with a viscosity of 10,000 cP or more at an elevated temperature.

25 Claims, 9 Drawing Sheets

(56) References Cited

U.S. PATENT DOCUMENTS

| | | |
|---|---|---|
| 2014/0048969 A1 | 2/2014 | Swanson et al. |
| 2014/0121813 A1 | 5/2014 | Schmehl |
| 2014/0242208 A1 | 8/2014 | Elsworthy |
| 2014/0291886 A1 | 10/2014 | Mark et al. |
| 2014/0328964 A1 | 11/2014 | Mark et al. |
| 2014/0363532 A1 | 12/2014 | Wolfgram |
| 2015/0035198 A1 | 2/2015 | Saba |
| 2015/0056432 A1 | 2/2015 | Solbert |
| 2015/0077215 A1 | 3/2015 | Ranky et al. |
| 2015/0093465 A1 | 4/2015 | Page |
| 2016/0009029 A1* | 1/2016 | Cohen .............. B29C 67/0085 264/493 |
| 2016/0075089 A1* | 3/2016 | Duro Royo ........ B29C 67/0088 264/308 |
| 2016/0325498 A1* | 11/2016 | Gelbart .............. B29C 67/0085 |

OTHER PUBLICATIONS

Simplify 3D; Printing with Multiple Extruders; Jul. 23, 2015; 5 Pages; www.simplify3d.com/support/tutorials.

3ders.org; New 3-way extruder and color blending nozzle developed for multi-colour/material 3D printing; 3D Printing Technology; Aug. 25, 2012; 11 Pages; www.3ders.org.

Francis X. Govers III; Diamond Hotend makes multi-color 3D printing possible from a single nozzle; Gizmag; Apr. 12, 2015; 6 Pages; www.gizmag.com.

e3d-online.com; Multi-Extrusion; E3D-Online; 2014; 6 Pages; www.e3d-online.com/Multi-Extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

Isaac Budmen; Understanding Shells, Layer Height and Infill; Team Budmen; Sep. 2013; 1 Page; www.blog.teambudmen.com.

\* cited by examiner

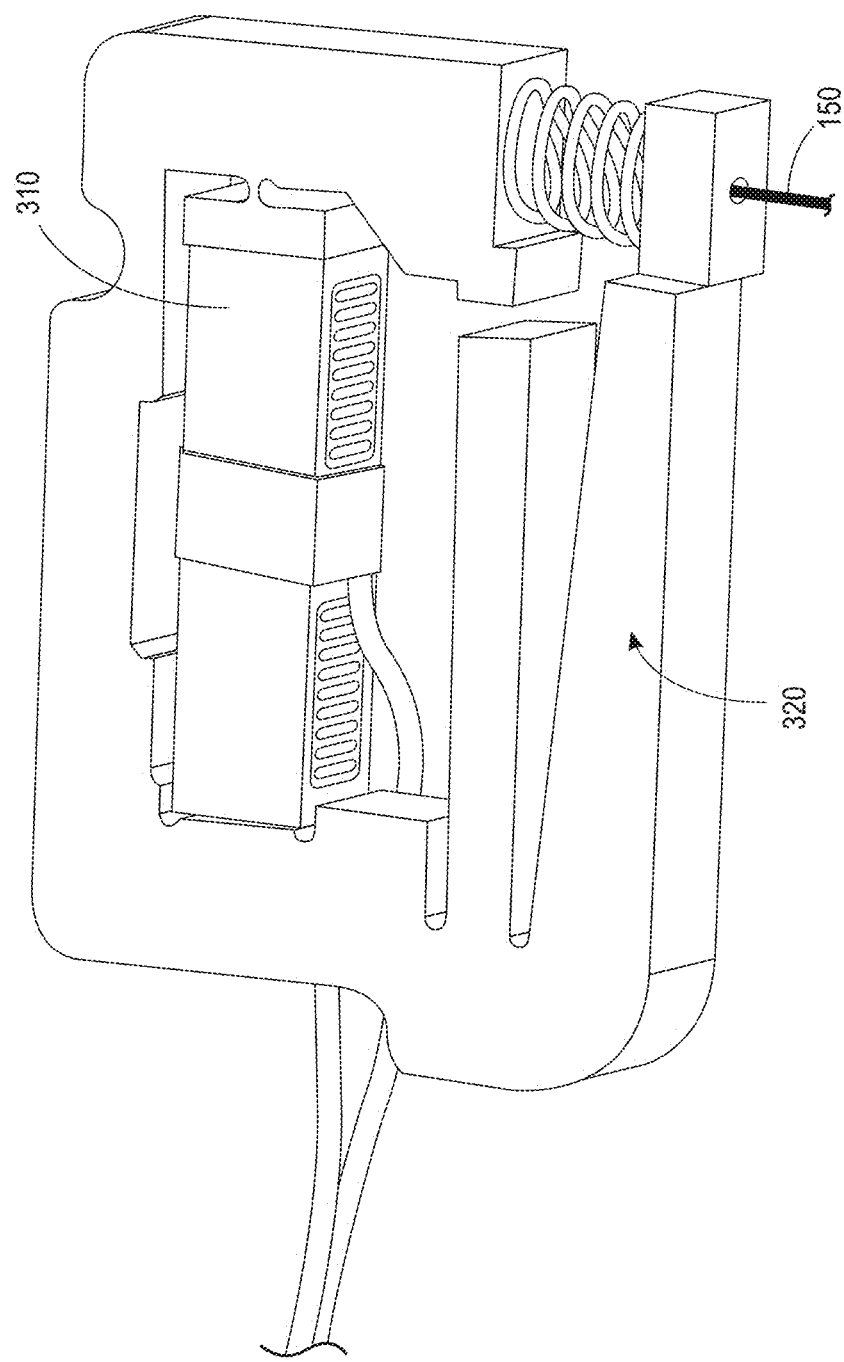

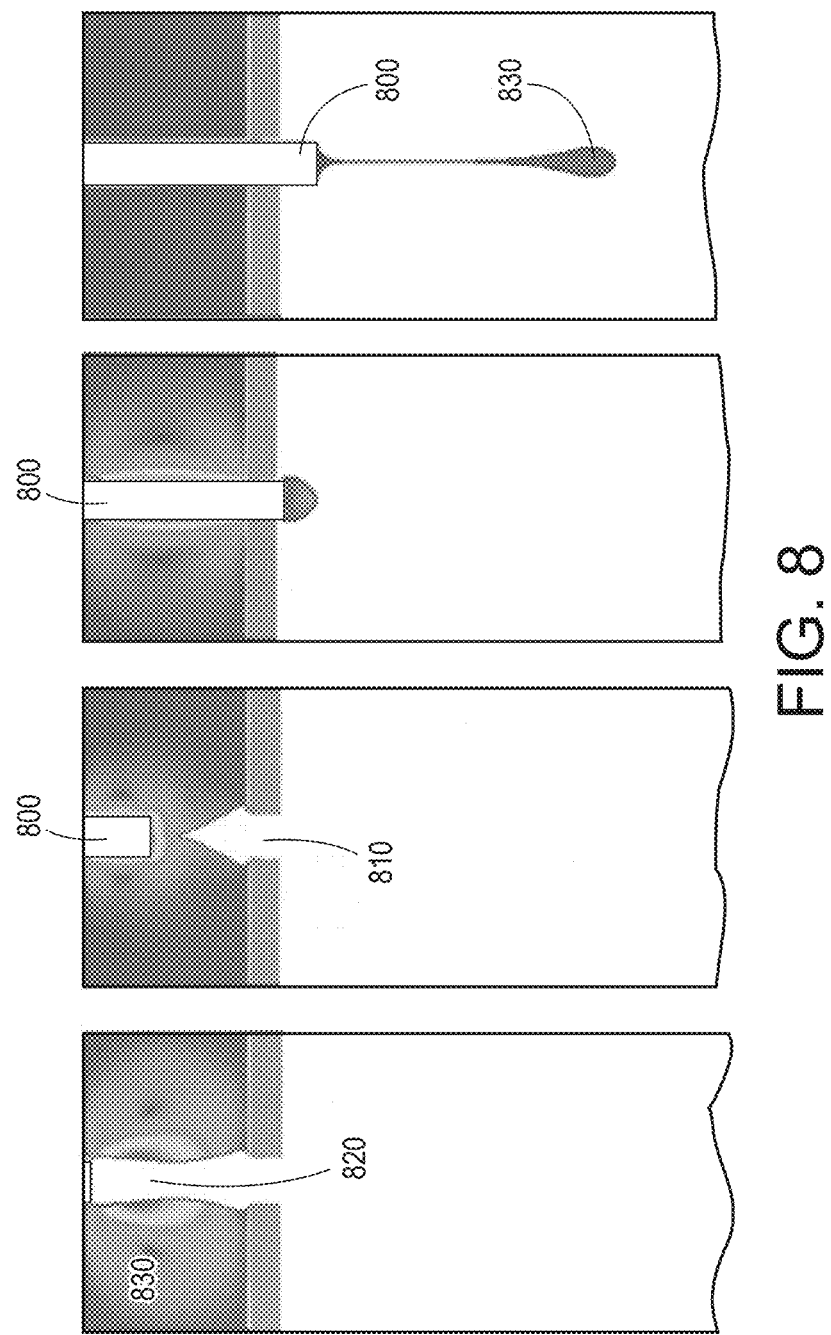

PIN-ACTUATED PRINTHEAD

BACKGROUND

Additive manufacturing processes (or 3D printing) involve the deposition of successive layers of a material to create a three-dimensional object. For example, by using inkjet printheads to deposit photopolymers to form an object. However, most current printheads have an upper limit of 10-20 centipoise (cP) for the viscosity of the materials that can be ejected. While other additive manufacturing methods, such as Fused Deposition Modeling (FDM) or Selective Laser Sintering (SLS), can use extremely viscous materials, they cannot provide multi-material composites or intermixing of the deposited materials, as can be done with jetted materials. Accordingly, there is demand for additive manufacturing processes that can create multi-material or multi-color composites using high viscosity materials.

SUMMARY

This summary is intended merely to introduce a simplified summary of some aspects of one or more embodiments of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Additional goals and advantages will become more evident in the description of the figures, the detailed description, and the claims.

The foregoing and/or other aspects and utilities embodied in the present disclosure may be achieved by providing a pin actuated printhead, including a plurality of orifices through which a material is ejected; at least one chamber to hold the material to be ejected; a plurality of channels connecting the chamber to the orifices; and a plurality of actuated pins, to enter the orifices and to eject the material from the orifices, wherein, the printhead is configured to eject a material with a viscosity of 10,000 cP or more at an elevated temperature.

In another embodiment, in a first open position, each of the actuated pins allows material to enter into the orifice, and wherein in a second closed position, each of the actuated pins blocks material in the channel from entering the respective orifice while simultaneously entering the orifice and ejecting the material therewith.

In another embodiment, a duration of time of each of the actuated pins in the first open position determines a volume of the material ejected.

In another embodiment, each orifice is configured to eject a drop of material with a diameter between 100 μm and 300 μm.

In another embodiment, in the closed position, each of the actuated pins protrudes past a plane defining an outer surface of the orifice.

In another embodiment, the pin actuated printhead further includes a plurality of pin chambers to guide a movement of the actuated pins.

In another embodiment, the pin actuated printhead further includes a plurality of actuator modules to move the actuated pins.

In another embodiment, the actuator modules includes one of an electromagnetic actuator and a piezo-electric actuator.

In another embodiment, the material is an engineering polymer with a viscosity of 50,000 cP or more at 200° C.

In another embodiment, the at least one chamber is configured to hold the material under pressure.

In another embodiment, the at least one chamber is configured to hold the material at a pressure between 50 psi and 150 psi.

In another embodiment, the at least one chamber is configured to hold the material at an elevated temperature of 100° C. or more.

In another embodiment, the at least one chamber comprises a plurality of chambers, each one connected to a plurality of orifices, and wherein each of the plurality of chambers provides material to each of the plurality of orifices.

In another embodiment, said plurality of chambers hold a plurality of different materials, each chamber providing material to a plurality of orifices In another embodiment, the actuator modules are spaced apart from the chamber, orifices, and material so as to enable heating of the chamber, orifices and material to a temperature that is higher than that of the actuator modules.

In another embodiment, said plurality of pins include a metallic wire.

In another embodiment, said plurality of pins are coated with a low adhesion coating to facilitate the separation of the ejected material from the tip of the pins.

In another embodiment, the plurality of actuated pins have a stepped configuration and the pin chambers are configured to engage the stepped configuration of the actuated pins to stop a movement of the actuated pins.

In another embodiment, the plurality of actuated pins has a stepped configuration and the pin chambers are configured to engage the stepped configuration of the actuated pins to provide a seal.

In another embodiment, the actuator module comprises a plurality of actuator modules, and the orifice comprises a plurality of orifices, each orifice associated with an actuator module, and the plurality of actuators are spaced apart from one another at a distance that is greater than a spacing between their associated orifices.

In another embodiment, the timing of each actuated pin is controlled such that the drops ejected by each actuated pin are of a consistent size.

In another embodiment, a duration of time of the actuated pin in the first open position is controlled such that drops ejected can be varied in size.

In another embodiment, said printhead is spaced apart from a surface receiving the ejected material such that the ejected material becomes airborne when traveling from said orifices to said receiving surface.

In another embodiment, said printhead is spaced close to a surface receiving the ejected material such that the pins carry said ejected material to said receiving surface.

In another embodiment, said actuators drive the plurality of pins through one of a lever arm or flexure, which amplifies the motion of said actuators.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which:

FIG. 5A illustrates an actuator module according to an embodiment;

FIG. 8 illustrates a model of material ejection according to an embodiment.

Figure 1:
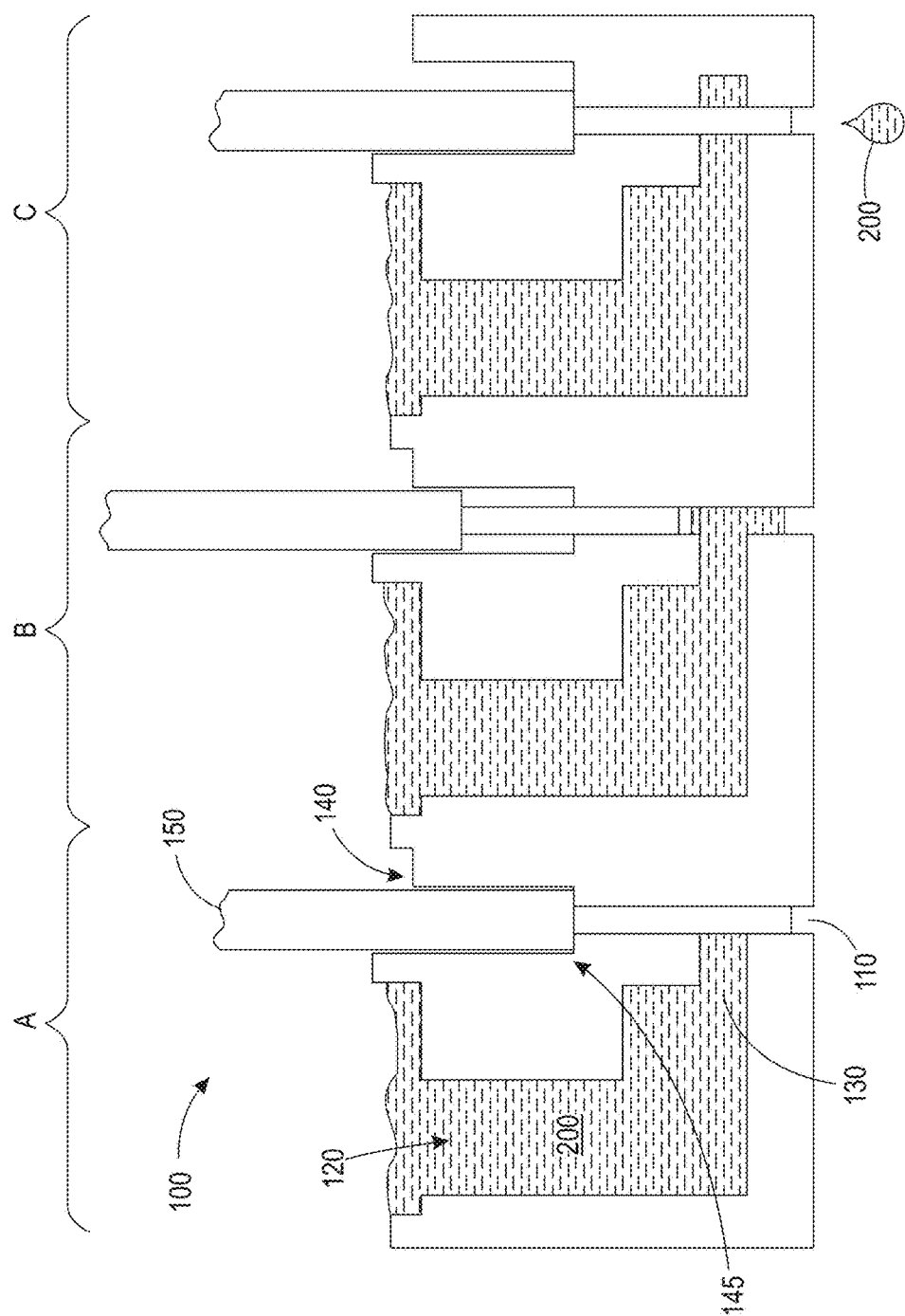
FIG. 1 illustrates a pin-actuated printhead according to an embodiment.

It should be noted that some details of the drawings have been simplified and are drawn to facilitate understanding of the present teachings rather than to maintain strict structural accuracy, detail, and scale. These drawings/figures are intended to be explanatory and not restrictive.

DETAILED DESCRIPTION

Reference will now be made in detail to the various embodiments in the present disclosure, examples of which are illustrated in the accompanying drawings and figures. The embodiments are described below to provide a more complete understanding of the components, processes and apparatuses disclosed herein. Any examples given are intended to be illustrative, and not restrictive. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

Attention is now directed to processing procedures, methods, techniques, and workflows that are in accordance with some embodiments. Some operations in the processing procedures, methods, techniques, and workflows disclosed herein may be combined and/or the order of some operations may be changed.

In one embodiment, a pin-actuated printhead is configured to eject high viscosity materials for additive manufacturing applications.

The material may include high viscosity materials, such as engineering polymers or photopolymers. In other embodiments, the material 200 may include solder paste, adhesives, food compounds, and other high viscosity materials. For example, the material to be ejected may include an ABS engineering polymer with a viscosity of 500,000 cP or greater at a temperature of 230° C.

In other embodiments, the pin-actuated printhead may eject high viscosity materials at an elevated temperature. For example, the material to be ejected at an elevated temperature may have a viscosity of 10,000 cP or greater or 50,000 cP or greater. In another embodiment, the material to be ejected may have a viscosity of 500,000 cP or greater.

FIG. 1 illustrates a pin-actuated printhead according to an embodiment. As illustrated in FIG. 1, a pin-actuated printhead may include an orifice 110, a chamber 120, a channel 130, a pin chamber 140, and an actuated pin 150.

The orifice 110 may be defined in a body of the printhead 100, and the printhead 100 may include one or more orifices 110. In other embodiments, the printhead 100 may include an orifice plate defining one or more orifices 110. In some embodiments, the orifices are spaced apart 1 mm from each other. The orifice 110 may have a diameter between 50 and 800 microns (μm). In another embodiment, the orifice 110 may have a diameter between 125 and 500 microns or between 150 and 300 microns.

The diameter and depth of the orifice 110 may be defined according to the material 200 to be ejected. For example, the orifice 110 may be configured to eject a drop of material 200 with a diameter of about 200 μm. In one embodiment, the orifice 110 may be configured to eject a drop of material 200 with a diameter between 100 μm and 300 μm. In another embodiment, the orifice 110 may be configured to eject a drop of material 200 with a diameter of 50 μm or greater.

The chamber 120 may be defined within the body of the printhead, and the printhead 100 may include one or more chambers 120. For example, the printhead 100 may include one or more chambers 120 to hold different types of material 200, and the printhead 100 may be configured to mix the different types of material 200 during ejection/printing of the material 200 through the orifices 110. For example, when printing an object, the printhead 100 may eject drops of one material 200 interspersed with drops of a different material 200. In some embodiments, an object created of various materials 200 may have mechanical or optical properties which are in between or an average of the two or more materials 200 used. In one embodiment, the chamber 120 is configured to hold a single material 200 to be ejected. In another embodiment, a plurality of chambers 120 hold a plurality of materials 200 to be ejected.

The printhead 100 may be configured to hold materials 200 of different colors and to mix the colors of the materials 200 ejected from the orifices 110 to adjust the color of the final 3D printed product. Similarly, the printhead 100 may be configured to hold materials 200 having different material properties and combining the materials 200 as they are ejected from the orifices 110 to adjust the final properties of the 3D printed product.

The material 200 may be held under pressure to facilitate ejection of the material 200. For example, the chamber 120 may be configured to hold material 200 to be ejected under pressure to facilitate a flow of material 200 to the orifice 110. In some embodiments, a pressure of 100 psi should enable a 100,000 cP material 200 to flow through the channel 130 and into the orifice 110 to support a firing frequency on the order of 1000 Hz. In other embodiments, the pressure applied to the material 200 in the chamber 120 may be adjusted according to a viscosity of the material 200, a firing frequency desired, and/or the dimensions of the printhead 100 components, including the orifices 110 and/or the channel 130. In one embodiment, the printhead 100 is configured to hold the material 200 at a pressure between 50 psi and 150 psi. In another embodiment, the printhead 100 is configured to hold the material 200 at a pressure of at least 25 psi.

The material 200 may be held at an elevated temperature to facilitate ejection of the material 200. For example, the chamber 120 may be configured to hold material 200 at 100° C. or greater to facilitate a flow of material 200 to the orifice 110. In another embodiment, the printhead 100 may be configured to heat the material to 200° C. or greater or to 300° C. or greater.

The channel 130 may be defined within the body of the printhead 100, and the printhead 100 may include one or more channels 130. In one embodiment, the channel 130 is configured to direct material 200 to be ejected into the orifice 110. The dimensions of the channel 130 may be adjusted according to the characteristics of the material 200 to be ejected.

Figure 2:
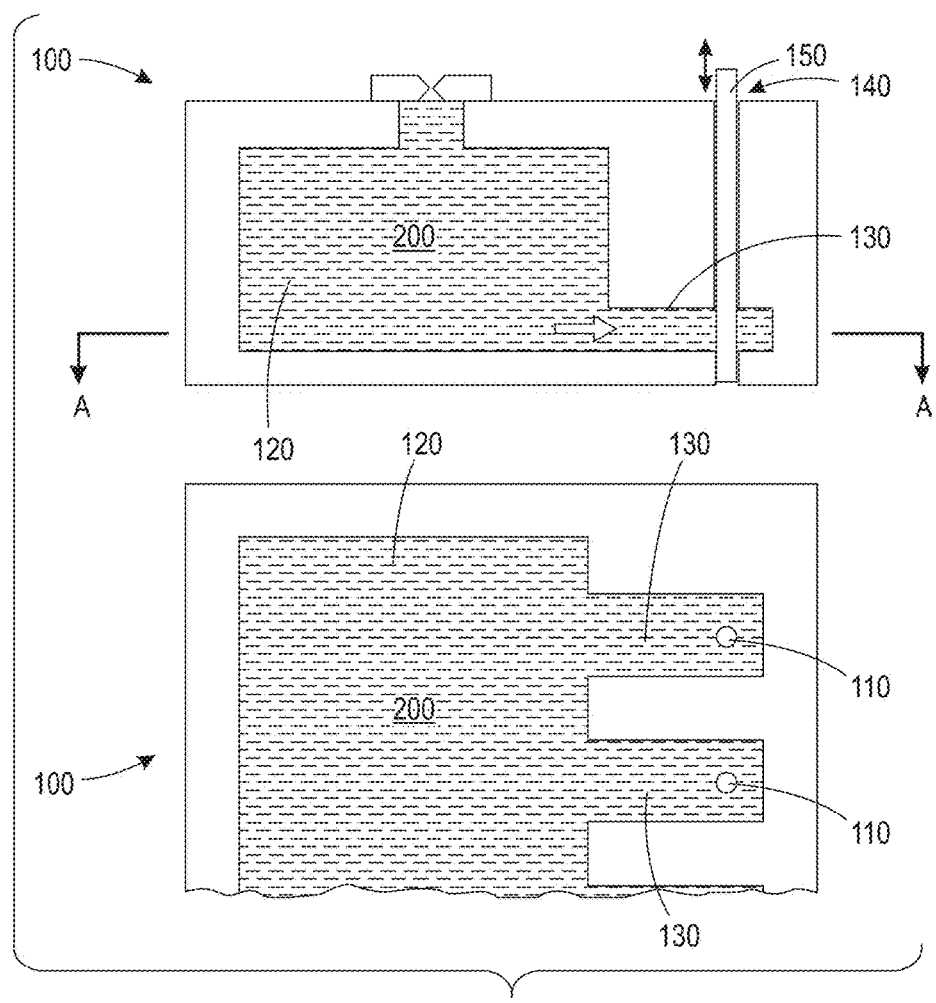
FIG. 2 illustrates a pin-actuated printhead according to an embodiment.
Figure 3:
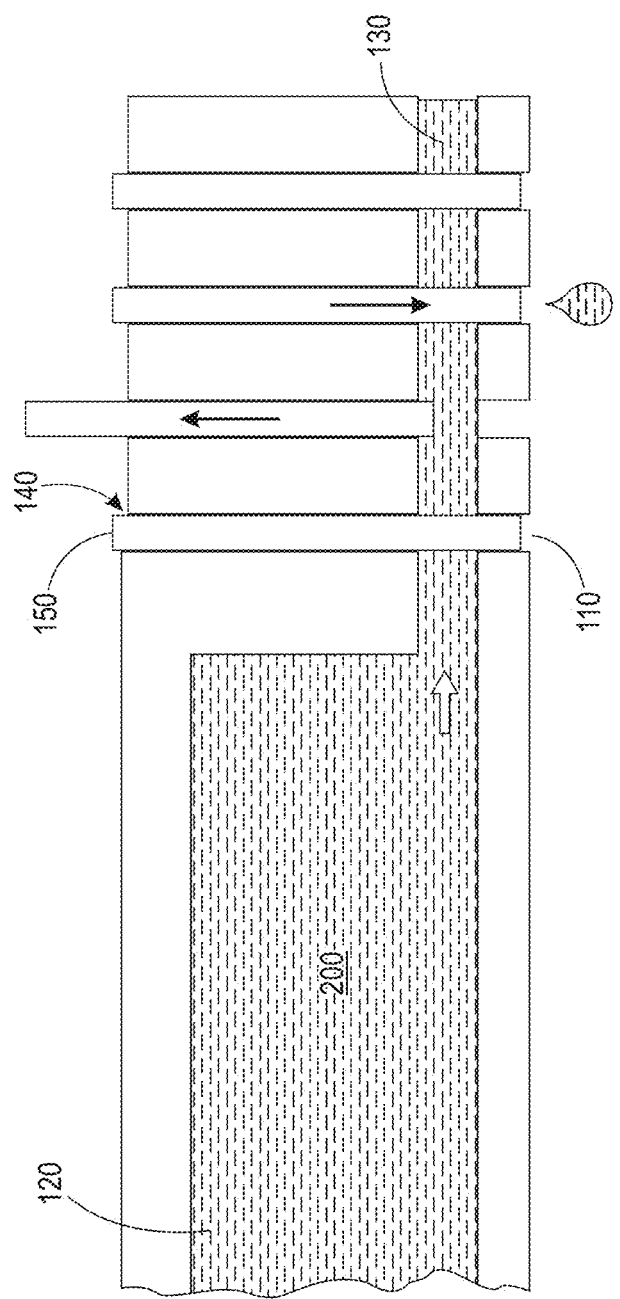
FIG. 3 illustrates a pin-actuated printhead according to an embodiment.

While FIG. 1 illustrates a printhead configuration according to an embodiment, other configurations of the printhead 100 are also possible. For example, FIGS. 2-3 illustrate other possible configurations of a printhead 100. As illustrated in FIG. 2, a printhead 100 may be configured to have a single chamber 120 providing material 200 to a plurality of orifices 110 through separate channels 130. Alternatively, as illustrated in FIG. 3, a printhead 100 may be configured to have a single chamber 120 providing material 200 to a plurality of orifices 110 through a single channel 130. The embodiment illustrated in FIG. 2 may reduce a flow resistance of the material 200 in the channels 130 or may minimize a pressure loss for the material 200 in the channel 130 and may enable greater flow rates for very high viscosity materials 200.

In some embodiments, each orifice 110 has an associated actuated pin 150 to eject material within the orifice 110, and each actuated pin 150 may move within a pin chamber 140 configured to guide a movement of the actuated pin 150.

The pin chamber 140 may be defined within the body of the printhead 100, and the printhead 100 may include one or more pin chambers 140. In one embodiment, the pin chamber 140 is configured to guide the actuated pin 150 into the orifice 110. In other embodiments, the pin chamber 140 guides the actuated pin 150 through at least a portion of the channel 130 and into the orifice 110. As illustrated in FIG. 1, the pin chamber 140 may have a stepped configuration to match a step configuration of the actuated pin to limit a movement of the actuated pin 150 and to provide a seal 145 at a point in the pin chamber 140. In another embodiment, a seal 145 may be provided by diametrical tolerances between the pin chamber 140 and the actuated pin 150. For example, as illustrated in FIGS. 2-3, a space between the pin chamber 140 and the actuated pin 150 may be selected to allow for easy movement of the actuated pin 150 while preventing a high viscosity material 200 from entering the pin chamber 140.

The actuated pin 150 may move within the pin chamber 140 and orifice 110. For example, the actuated pin 150 may be moved via electromagnets, piezoelectric devices, or other driver mechanisms. The actuated pin 150 may be configured to push material 200 within the channel 130 and/or the orifice 110 out of the printhead 100.

In one embodiment, a firing cycle of the printhead 100 is defined by the movement of the actuated pin 150. For example, as illustrated in FIG. 1, a firing cycle may start with the actuated pin 150 in a closed position "A." The actuated pin 150 may be positioned within the orifice 110 and may prevent any significant flow of material 200 into the orifice 110. The actuated pin may then move into an open position "B," retracting the actuated pin 150 from within the orifice 110 and allowing the flow of material 200 into the orifice 110. In some embodiments, the actuated pin 150 may only partially retract to control an amount of material flow into the orifice 110. Finally, the actuated pin 150 may move back into a closed position "C" to complete the firing cycle. As illustrated in FIG. 1, moving into the closed position, the actuated pin 150 may push material 200 in the orifice 110 out of the printhead 100. As illustrated in FIG. 8, the actuated pin 150 may move past an outer surface of the orifice 110 to eject material 200 previously within the orifice 110.

In some embodiments, the actuated pin 150 may be embodied as a wire. For example, the actuated pin 150 may be a metallic wire, such as stainless steel or tungsten, with a diameter between 200 to 300 micrometers (μm). In one embodiment, the actuated pin 150 has a diameter between 100 μm and 500 μm.

The actuated pin 150 may be configured to move through the pin chamber 140 and the orifices 110 to eject the material 200. The distance traveled by the actuated pin 150 to eject the material 200 may depend on the configuration of the printhead 100 and/or the characteristics of the material 200. For example, the actuated pin may be configured to move a distance of 1.5 mm or less during firing cycles. In one embodiment, the actuated pin may move a distance of 1.0 mm or less during firing cycles. In another embodiment, the actuated pin 150 may move a distance of 0.5 mm or less. In yet another embodiment, the actuated pin 150 may move between 0.4 mm and 0.5 mm.

The actuated pin 150 may move with a velocity of 1 meter per second (M/s) or greater. In one embodiment, the actuated pin may move with a velocity of about 2 M/s or greater during firing cycles. In another one embodiment, the actuated pin may move with a velocity of 5 M/s or greater during firing cycles. In some embodiments, the actuated pin may decelerate at a rate of 20 M/sec$^2$ or greater to facilitate the ejection of the viscous material from the end of the pin. For example, in some embodiments, a deceleration of the actuated pin 150 can be facilitated through the use of hard stops, or other elements, that abruptly stop the motion of the actuated pin 150.

The actuated pin 150 may be configured to achieve a firing frequency of about 1000 Hz. In one embodiment, the firing frequency of the actuated pin 150 is between 500 Hz and 1500 HZ. In another embodiment, the firing frequency of the actuated pin 150 is between 100 Hz and 2000 Hz.

In one embodiment, the actuated pin 150 includes a low adhesion material or coating, such as FDTS or TEFLON, to lessen an adhesion of the material 200 to the actuated pin 150.

The printhead 100 may be spaced away from a surface of the object being printed, and material 200 ejected from the printhead 100 becomes airborne when ejected from the orifices 110 while travelling towards said surface. In another embodiment, the printhead 100 is close to the surface of the object being printed, and the actuated pins 150 carry the material ejected from the orifices 110 to a surface of the object being printed.

Figure 4:
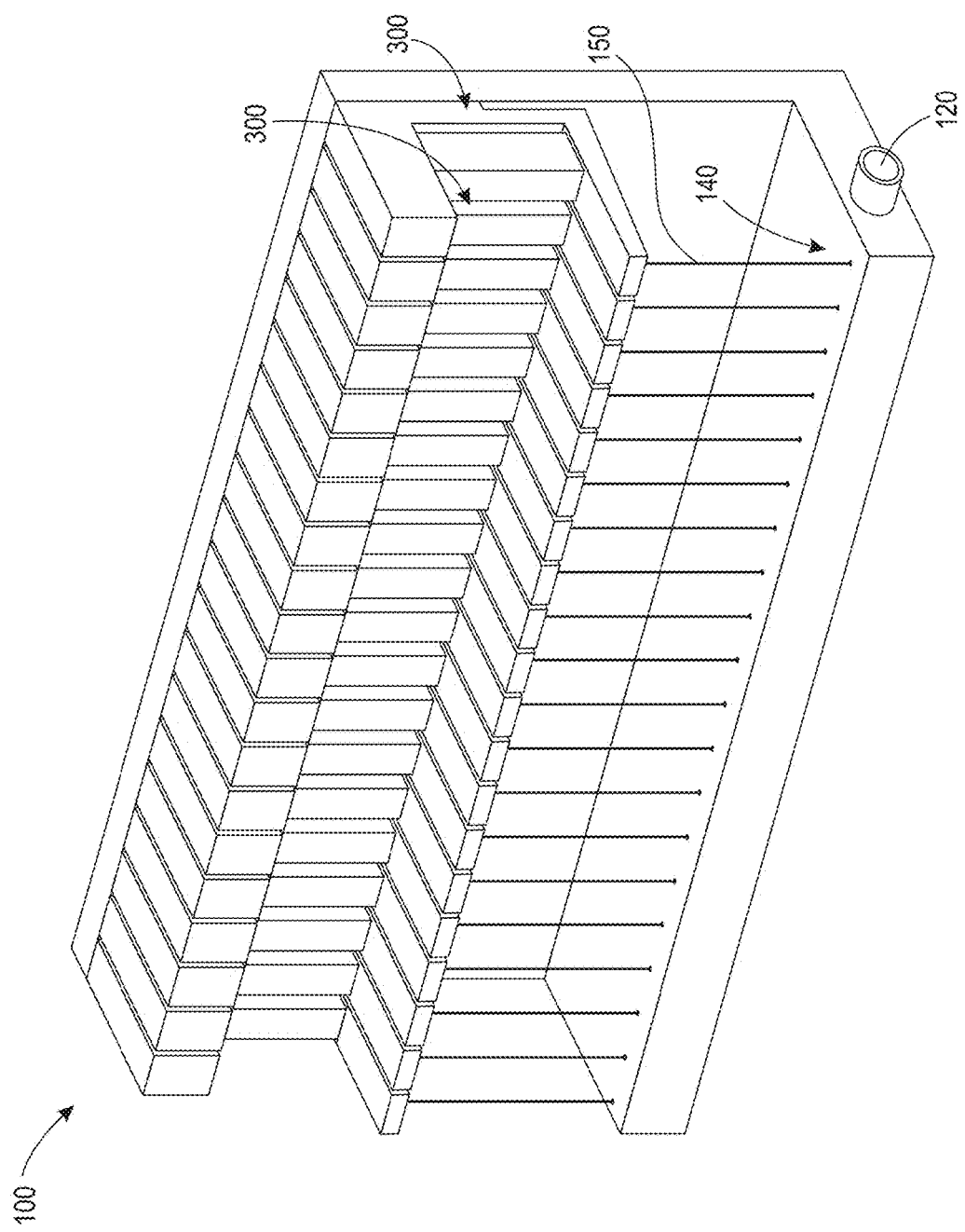
FIG. 4 illustrates a pin-actuated printhead with an actuator module according to an embodiment.

FIG. 4 illustrates a pin-actuated printhead with an actuator module according to an embodiment. As illustrated in FIG. 4, a printhead 100 may include a plurality of orifices 110 to eject a material 200 (not illustrated), a chamber 120 to hold the material 200 to be ejected, a plurality of actuated pins 150, and a plurality of actuator modules 300. It should be appreciated that a plurality of chambers 120 could be incorporated into a printhead 100, with each chamber 120 delivering a different material to a plurality of orifices 110.

The actuator module 300 may be used to drive the movement of an actuated pin 150 within the printhead 100. In some embodiments, the actuator module 300 may be embodied as an electromagnetic actuator connected to one end of an actuated pin 150 and configured to move the actuated pin 150 within the printhead 100.

Figure 5B:
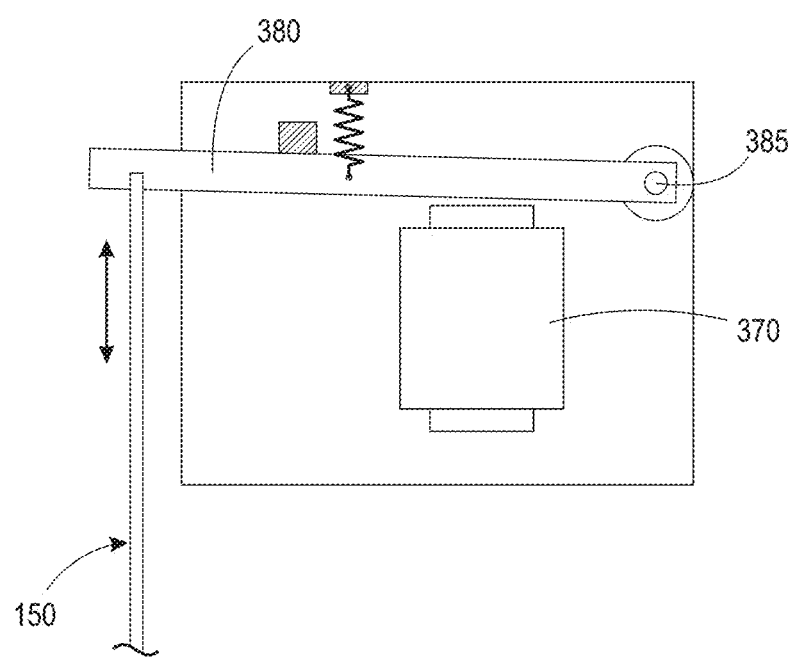
FIG. 5B illustrates an actuator module according to an embodiment.

In other embodiments, the actuator module 300 may be embodied as solenoids, electromagnets pulling on actuator arms, stacked arrays of piezo actuators, or other mechanisms to drive a movement of the actuated pins 150. Stacked piezo actuators offer high reliability and a flexure can be used to amplify the motion from a stacked piezo actuator. For example, as illustrated in FIG. 5A, the actuator module 300 may include a stacked piezo actuator 310 and flexures for motion amplification 320. As illustrated in FIG. 5B, the actuator module 300 may include an electromagnet 370 and a pivoting arm 380 which drives an actuated pin 150. The pivoting arm 380 can be positioned with a pivot point 385 close to the electromagnet 370, resulting in a small gap and strong electromagnetic attractive force, and the length of the pivoting arm 370 provides an amplification of the motion at the end where the actuated pin 150 is attached.

According to some embodiments, a configuration of a group of printheads 100 and/or the configuration of the actuator modules 300 may be modified to improve an overall density or resolution of a 3D printing system utilizing the printhead 100. For example, FIGS. 6-7 illustrate different configuration of pin-actuated printheads with actuator modules.

Figure 6:
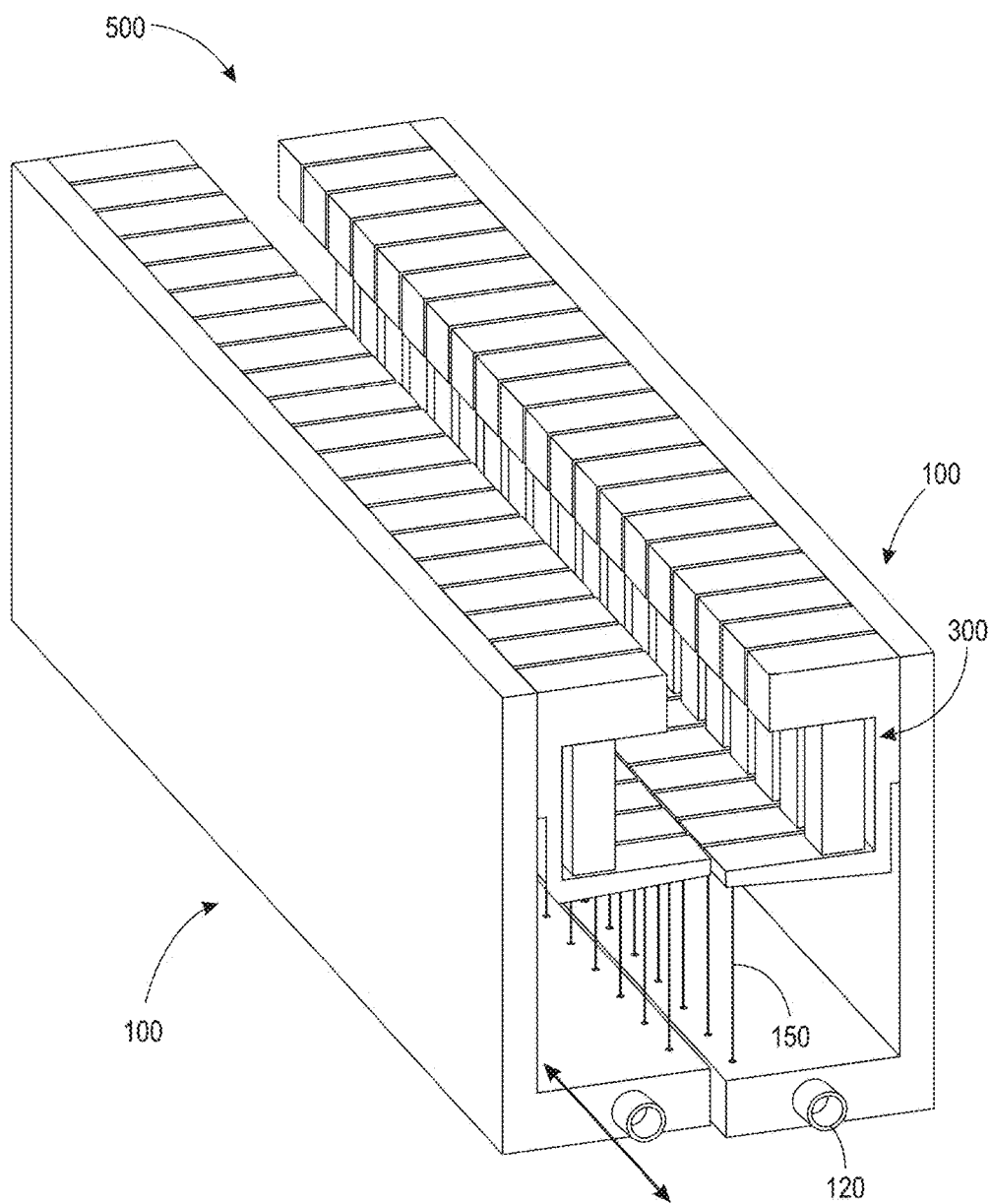
FIG. 6 illustrates a pin-actuated printhead array according to an embodiment.
Figure 7:
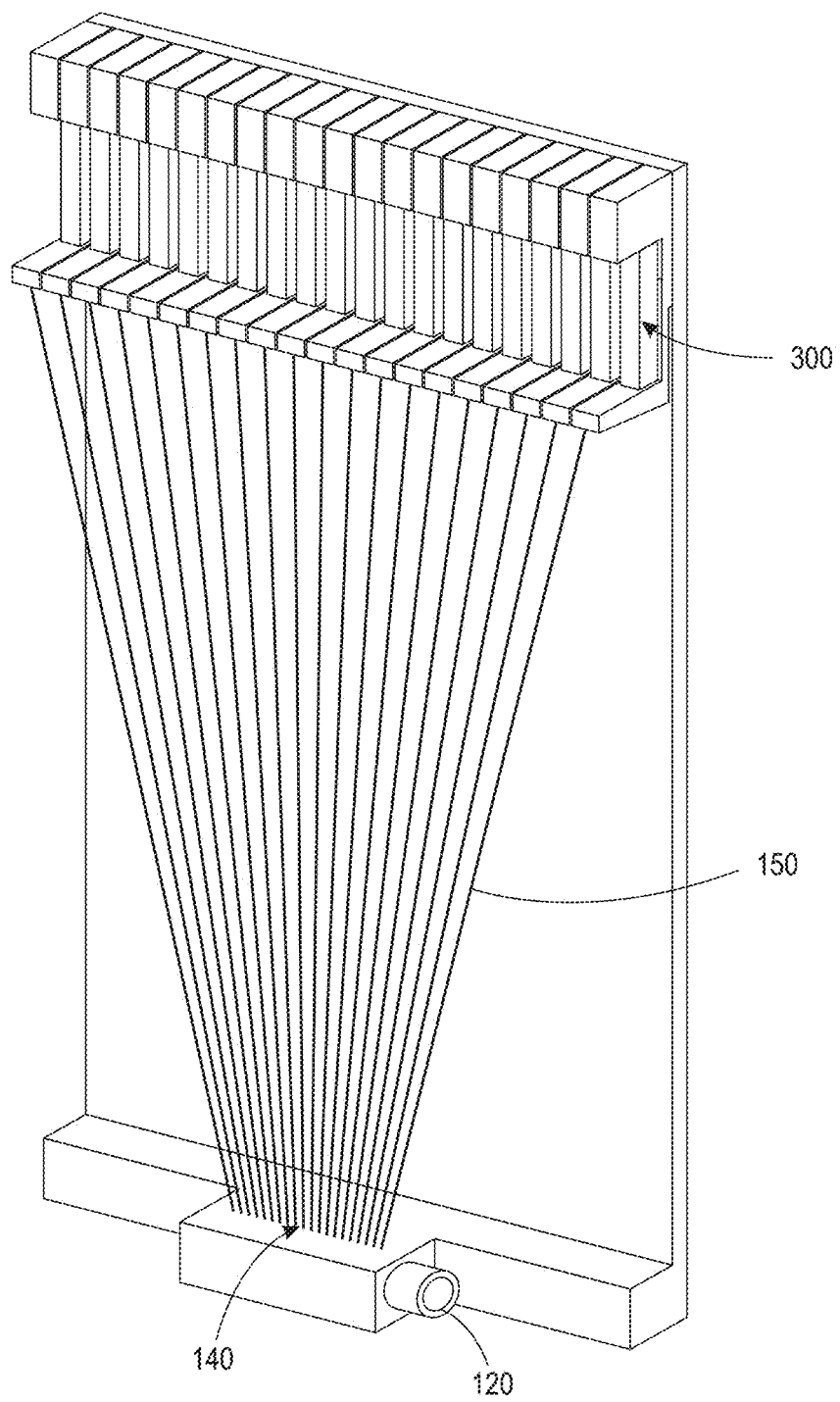
FIG. 7 illustrates a pin-actuated printhead with an actuator module according to an embodiment.

As illustrated in FIG. 6, two printheads 100, each may be positioned face-to-face and staggered to create an overall printing array 500 with a half pitch spacing between the facing orifices 110. In some embodiments, the printing array 500 can be indexed between passes to improve an overall resolution.

In other embodiments, the actuated pins 150 may be disposed in a fan-like configuration to improve the resolution or density of ejection orifices of the printhead 100. For example, as illustrated in FIG. 7, the plurality of actuated pins 150 extend at an angle from each actuator module 300 to a converging area of the printhead 100 with the orifices 110. In some embodiments, the printhead 100 includes guides to guide the actuated pins 150 and prevent buckling or flexing. The guides may be molded, machined, or otherwise formed on the printhead 100.

According to some embodiments, a volume of material 200 ejected by the printhead 100 may be controlled according to a movement of the actuated pin 150. For example, the volume of material that flows into the void created by the retraction of the actuated pin 150 from the orifice 110 and/or the channel 130 may depend on the time that the actuated pin 150 remains in the retracted position.

FIG. 8 illustrates a model of material ejection. As illustrated in FIG. 8, the retraction of an actuated pin 800 from an orifice area 810 initially creates a void 820. A material to be ejected 830 then flows into the void 820, whereby, it is ejected from the orifice area 810 by a movement of the actuated pin 800. The actuated pin 800 may eject material 830 even if the void 820 is only partially filled.

In some embodiments, the time period between retraction of the actuated pin 800 and its return movement determines the percentage of the void 820 filled by the material 830. In other embodiments, the temperature, viscosity, and other characteristics of the material 830 also determine the percentage of the void 820 filled between the movements of the actuated pin 800. Accordingly, in some embodiments, the movement of the actuated pin 800 may be controlled to adjust the size or volume of the material 830 ejected. In other embodiments, the timing of individual actuated pins 800 may be adjusted as a method of normalizing an amount of material 830 ejected. That is, the timing of the actuated pins 800 may be adjusted so that all actuated pins 800 in a group eject consistent or equal volumes of the material 830.

In one embodiment, a speed at which the actuated pin 800 moves to eject the material 830 may determine the speed of ejection for the material 830. A high speed of ejection may help minimize a drop placement during a 3D printing operation, whereas a lower ejection speed may allow the material 830 to coalesce into a more spherical drop during an ejection operation.

With respect to FIG. 1, the extent to which the orifice 110, which may extend up into the channel 130, refills with material 200 can be determined by the time period between the retraction of the actuated pin 150 (open position) and the firing of the actuated pin 150 (closed position). A long period of the actuated pin 150 in the open position allows the channel to fill completely, and the amount of material ejected to be maximized. A shorter period will only allow partial refilling, and the amount of material ejected will depend on the percentage of refilling. Accordingly, this timing difference can be used to create variable drop sizes for the ejected material 200. In some embodiments, this variation can be used to create grayscale as well as to "norm" the drop size for each orifice.

In one embodiment, the printhead 100 is between 1 mm and 10 mm away from the surface of the object being printed. In another embodiment, the drops of material 200 ejected from the printhead 100 travel between 0.5 mm and 10 mm before being deposited.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. A pin actuated printhead, comprising:
a plurality of orifices through which a material is ejected;
at least one chamber to hold the material to be ejected at an elevated temperature of 100° C. or more;
a plurality of channels connecting the at least one chamber to the plurality of orifices; and
a plurality of actuated pins, to enter the plurality of orifices and to eject drops of the material from the plurality of orifices,
wherein, the printhead is configured to eject a material with a viscosity of 10,000 cP or more at the elevated temperature, and
wherein, the at least one chamber is configured to hold the material at a pressure of 25 psi or greater to support a firing frequency of the plurality of actuated pins between 100 Hz and 2000 Hz.

2. The printhead of claim 1 wherein, in a first, open, position, the plurality of actuated pins allows material to enter into an associated orifice, and wherein in a second, closed, position, the plurality of actuated pins blocks material in an associated channel from entering the associated orifice, while simultaneously, entering the associated orifice and ejecting the material therewith.

3. The printhead of claim 2, wherein a duration of time of each of the actuated pins in the first, open, position determines a volume of the drop of material ejected.

4. The printhead of claim 2, wherein each orifice is configured to eject a drop of material with a diameter between 100 μm and 300 μm, and
wherein, the firing frequency of the plurality of actuated pins is between 500 Hz and 1500 Hz.

5. The printhead of claim 2, wherein in the second, closed, position, each of the actuated pins protrudes past a plane defining an outer surface of the orifice.

6. The printhead of claim 1, further comprising a plurality of pin chambers to guide a movement of the plurality of actuated pins.

7. The printhead of claim 1, further comprising a plurality of actuator modules to move the plurality of actuated pins,
wherein the plurality of actuated pins move with a velocity of 1 M/s or greater and decelerate at a rate of 20 M/sec² or greater.

8. The printhead of claim 7, wherein the plurality of actuator modules comprise at least one of electromagnetic actuators and piezo-electric actuators, and
wherein the plurality of actuated pins move with a velocity of 5 M/s or greater.

9. The printhead of claim 8, wherein the at least one chamber holds the material to be ejected at an elevated temperature of 200° C. or more and wherein the material is an engineering polymer with a viscosity of 50,000 cP or more at 200° C.

10. The printhead of claim 9, wherein the material has a viscosity of 500,000 cP or more at 230° C.

11. The printhead of claim 1, wherein the at least one chamber is configured to hold the material at a pressure between 50 psi and 150 psi.

12. The printhead of claim 10, wherein the at least one chamber is configured to hold the material at an elevated temperature of 300° C. or more.

13. The printhead of claim 1, wherein the at least one chamber comprises a plurality of chambers, each one of the plurality of chambers is associated with one or more of the plurality of orifices, and wherein each one of the plurality of chambers provides material to the associated orifices.

14. The printhead of claim 13, where said plurality of chambers hold a plurality of different materials, each chamber providing material to the associated orifices.

15. The printhead of claim 7, wherein the plurality of actuator modules are spaced apart from the at least one chamber, the plurality of orifices, and material so as to enable heating of the at least one chamber, the plurality of orifices, and material to a temperature that is higher than that of the actuator modules.

16. The printhead of claim 1, where said plurality of actuated pins comprise a metallic wire.

17. The printhead of claim 1, where said plurality of actuated pins are coated with a low adhesion coating to facilitate the separation of the ejected material from the tip of the plurality of actuated pins.

18. The printhead of claim 7, further comprising a plurality of pin chambers to guide a movement of the plurality of actuated pins, wherein the plurality of actuated pins have a stepped configuration and the plurality of pin chambers are configured to engage the stepped configuration of the plurality of actuated pins to stop a movement of the plurality of actuated pins.

19. The printhead of claim 7, further comprising a plurality of pin chambers to guide a movement of the plurality of actuated pins, wherein the plurality of actuated pins have a stepped configuration and the plurality of pin chambers are configured to engage the stepped configuration of the plurality of actuated pins to provide a seal.

20. The printhead of claim 7, wherein each of the plurality of orifices is associated with one of the plurality of actuator modules, and the plurality of actuators modules are spaced apart from one another at a distance that is greater than a spacing between their associated orifices.

21. The printhead of claim 3, wherein the timing for each one of the plurality of actuated pins is controlled such that the drops of material ejected by each one of the plurality of actuated pins are of a consistent size.

22. The printhead of claim 2, wherein a duration of time of each one of the plurality of actuated pins in the first, open, position is controlled such that the drops of material ejected can be varied in size.

23. The printhead of claim 1, where said printhead is spaced apart from a surface receiving the drops of ejected material such that the drops of ejected material becomes airborne when traveling from said orifices to said receiving surface.

24. The printhead of claim 1, where said printhead is spaced close to a surface receiving the drops of ejected material such that the plurality of actuated pins carry said drops of ejected material to said receiving surface.

25. The printhead of claim 7, where said plurality of actuators drive the plurality of actuated pins through one of a lever arm or flexure, which amplifies the motion of said plurality of actuators.

\* \* \* \* \*